Nov. 2, 1937.   R. H. KINGDON   2,097,695
CABLE CLAMP
Filed Feb. 23, 1935
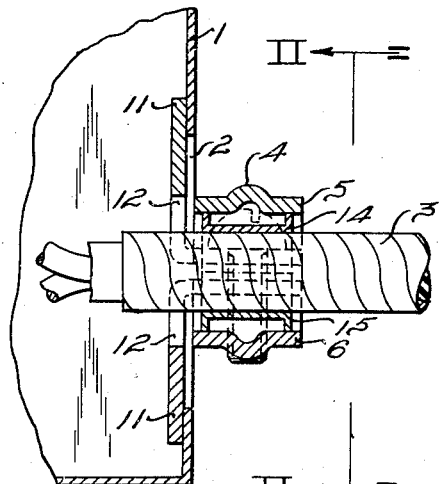
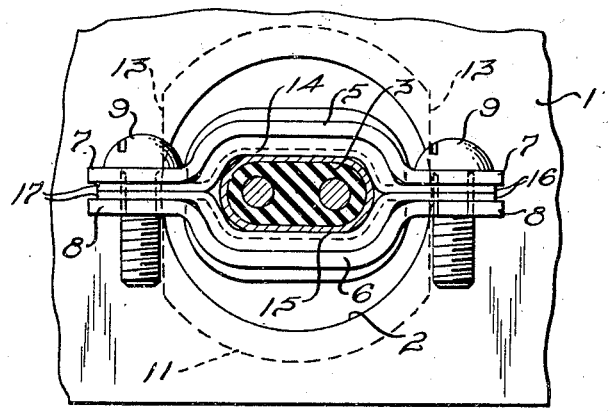
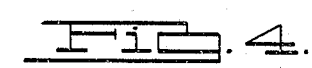
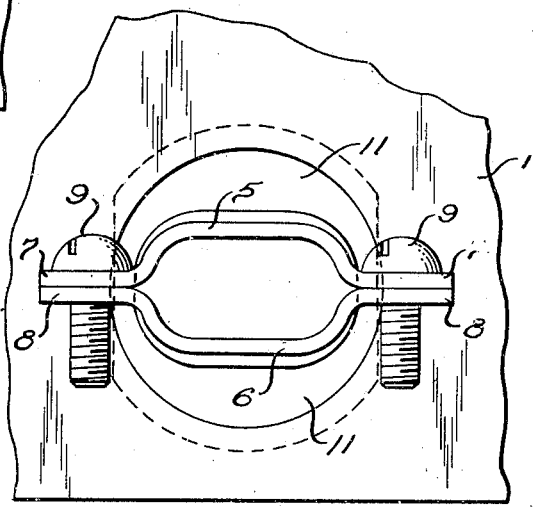
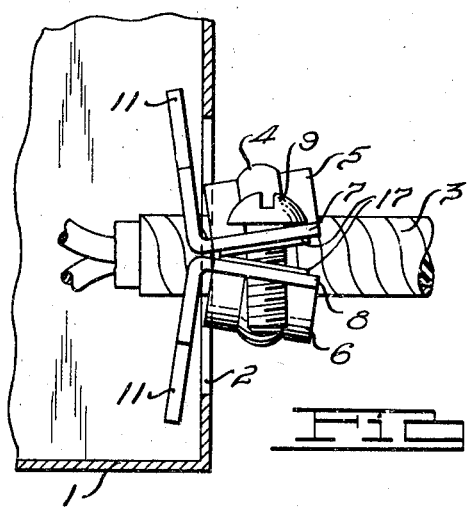
INVENTOR.
Ralph H. Kingdon.
BY
ATTORNEY.

Patented Nov. 2, 1937

2,097,695

UNITED STATES PATENT OFFICE 2,097,695

CABLE CLAMP

Ralph H. Kingdon, Detroit, Mich., assignor to Square D Company, Detroit, Mich., a corporation of Michigan Application February 23, 1935, Serial No. 7,776

3 Claims. (Cl. 247—25)

This invention relates to cable clamps for connecting cables to electrical fixture boxes. Boxes for electrical fixtures such as switch boxes are equipped with conduit knockouts, removal of which results in an opening affording entrance of a cable. These conduit knockouts have standard sizes, and cable dimensions do not conform exactly to the conduit sizes and shape and ordinarily neither the cable nor the clamp would completely close the knockout opening through which the cable enters the box unless a special provision for such closure is incorporated in the clamp or otherwise provided. The cable dimensions vary greatly and a clamp designed to receive one size of cable will not ordinarily function to clamp a cable of different size unless some adapter or other means is provided.

One object of this invention is to provide a cable clamp having improved means for securing the clamp to the box wall.

Another object of this invention is to provide a cable clamp with a large flange for closing the opening in the box wall.

Another object of this invention is to provide a cable clamp having closing flanges thereon wherein the means for tightening the clamp about a conductor serves to tighten the flange against the box wall and to secure the clamp relative to the box wall.

Another object of this invention is to provide a cable clamp with improved means adapting it for use with smaller size conductors.

Another object of this invention is to provide a cable clamp having a split sleeve body portion with complementary adapter elements extending across said body portion and cooperating with the body sections to clamp a small size conductor within the clamp.

Other objects and features of this invention will be readily apparent to those skilled in the art from the following specification and the appended drawing illustrating certain embodiments of the invention in which:

Figure 1 is a longitudinal sectional assembly view of a cable attached to a box by the clamp and adapter.

Figure 2 is an outside end view of the attached cable corresponding to that taken on the line II—II of Figure 1.

Figure 3 is a longitudinal view of the clamp as inserted in a box about a conductor before it is tightened.

Figure 4 is an outside end view of the clamp as used to secure a large cable to the box.

The box 1 has a conduit knockout opening 2 therein through which the cable 3 is to be inserted into the box. The clamp comprises a body portion 4 made up of sections 5 and 6 having interior surfaces conforming to the shape of the cable to be clamped. At the opposite sides of these sections are integral ears 7, 7 and 8, 8, the ears 7 having openings slidably receiving tightening screws 9, 9 and the ears 8 having openings which are threaded to receive the screws.

Attached to the inner side of the body portion and adjacent the edges thereof are flanges 11, 11 having cutout portions 12 conforming to the contour of the clamp to clear the cable. These flanges extend above the clamp a distance greater than the extent of the knockout opening and at their sides 13, 13 are cut away to form straight edges substantially at right angles to the transverse axis of the body portion. The width of the flanges between these sides 13, 13 is substantially equal to or slightly less than the diameter of the knockout opening 2.

The space between the inner edges of ears 7 and the plane of the outer face of the flange 11 is slightly less than the thickness of the box wall to which the clamp is to be attached.

When the clamp sections are inserted in the box wall by sliding the flange through the knockout opening the clamp will assume the position shown in Figure 3, being tilted to afford the necessary clearance for the box wall. When the clamp is tightened into the position shown in Figures 1 and 2 the sections 5 and 6 are clamped about a conductor and extend generally parallel thereto and the flanges 11 are moved into tight clamping engagement with the box walls, thus tightly closing the opening 2 and securing the clamp into position relative to the box wall. The engagement thus secured is very tight and cannot be moved by any ordinary means without loosening the screws 9.

In Figures 1 to 3 inclusive the clamp heretofore described is provided with adapter means to secure a smaller size cable which could not be taken by the body of the clamp. Here two complementary adapter elements 14 and 15 are disposed within the sections 5 and 6 of the body portion. The contour of the surface of the adapter elements is made to conform to the inner surface of the body portion of the clamp although it is obvious that the contour may be changed to enable the adapter to closely engage a different shape conductor. These adapter elements are channel shape in cross section as shown in Figure 1 with the legs of the channel serving as spacing means for the inner surface of the body portion of the clamp. The elements 14 and 15 are equipped at their opposite ends with ears 16 and 17 having openings therein loosely engaging the screws 9 between ears 7 and 8 on the body sections. The ear portions on the adapter elements are for the purpose of maintaining them in place within the body portion, the tightening force being applied through the legs of the channel bearing against the inner surface of the body portion.

It is readily apparent that many modifications of this securing means may be made, as an example of which the ears 16 and 17 may be entirely omitted and the legs of the channel received within grooves formed in the inner surface of the body portions 5 and 6.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What is claimed is:

1. A cable clamp for securing a conductor within an opening in a box wall, which opening is appreciably wider than the conductor, comprising a body portion of a size approximating the conductor size and formed of separable sections embracing the conductor and adapted to be positioned on one side of the box wall, flanges at one end of the body sections having portions extending beyond the edges of the opening and adapted to be positioned on the opposite side of the box wall to close the opening therein, cooperating pairs of ears on opposite sides of said sections extending beyond the edges of the opening at said one side of the box wall, and screw means cooperating with said ears for drawing the sections together about the conductor, said clamp being maintained in position by the engagement of the box wall between the flange portions and the edges of the ears.

2. A clamp for securing a conductor within an opening in a box wall comprising a body portion formed of separable sections embracing the conductor and adapted to be positioned on one side of the box wall, relatively wide flanges at one end of the body sections adapted to be positioned on the opposite side of the box wall to close the opening therein, cooperating pairs of ears on opposite sides of said body portion and extending beyond the edges of the opening at said one side of the box wall, the space between the edges of the ears and the surfaces of the flanges being slightly less than the thickness of the box wall whereby said clamp will be maintained in place by the clamping of the box wall between the flanges and ears upon tightening of said sections into conductor embracing position.

3. A cable clamp for securing a conductor within an opening in a box wall, which opening is appreciably larger than the conductor, comprising a body portion of a size approximating the conductor size and formed of separable sections embracing the conductor and adapted to be positioned on one side of the box wall, flanges at one end of the body sections having portions extending beyond the edges of the opening and adapted to be positioned on the opposite side of the box wall, cooperating pairs of ears on opposite sides of said sections extending beyond the edges of the opening at said one side of the box wall, screw means cooperating with said ears for drawing the sections together, the space between the edges of the ears and the surfaces of the flanges being slightly less than the thickness of the box wall whereby said sections will be tilted when loose to accommodate the wall and when tightened about the conductor by said screw means, the flanges will be moved into engagement with the box wall which will then be clamped between the flanges and the edges of the ears.

RALPH H. KINGDON.